(12) United States Patent
Luedtke et al.

(10) Patent No.: US 11,043,912 B2
(45) Date of Patent: Jun. 22, 2021

(54) SENSORLESS POSITION ESTIMATION FOR INTERIOR PERMANENT MAGNET SYNCHRONOUS MOTOR

(71) Applicants: Daniel R Luedtke, Beverly Hills, MI (US); Nitinkumar Patel, Oakland, MI (US); Mustafa Mohamadian, Birmingham, MI (US); Lakshmi Narayanan Srivatchan, Auburn Hills, MI (US)

(72) Inventors: Daniel R Luedtke, Beverly Hills, MI (US); Nitinkumar Patel, Oakland, MI (US); Mustafa Mohamadian, Birmingham, MI (US); Lakshmi Narayanan Srivatchan, Auburn Hills, MI (US)

(73) Assignee: FCA US LLC

( * ) Notice: Subject to any disclaimer, the term of this patent is extended or adjusted under 35 U.S.C. 154(b) by 0 days.

(21) Appl. No.: 16/572,764

(22) Filed: Sep. 17, 2019

(65) Prior Publication Data

US 2020/0099323 A1   Mar. 26, 2020

Related U.S. Application Data

(60) Provisional application No. 62/733,955, filed on Sep. 20, 2018.

(51) Int. Cl.
*H02P 21/20* (2016.01)
*H02P 21/22* (2016.01)
(Continued)

(52) U.S. Cl.
CPC .............. *H02P 21/20* (2016.02); *H02P 6/183* (2013.01); *H02P 21/18* (2016.02); *H02P 21/22* (2016.02)

(58) Field of Classification Search
CPC .. H02P 21/24; H02P 21/18; H02P 6/18; H02P 21/22; H02P 6/183; H02P 21/20
See application file for complete search history.

(56) References Cited

U.S. PATENT DOCUMENTS 6,137,258 A    10/2000  Jansen
6,639,380 B2*  10/2003  Sul ........................ H02P 21/24
                                                                318/700

(Continued)

OTHER PUBLICATIONS

Silverio Bolognani et al: "Automatic Tracking of MTPA trajectory in IPM Motor Drives Based on AC Current Injection", IEEE Transactions on Industry Applications, IEEE Service Center, Piscataway, NJ, US, vol. 37, No. 1, Jan. 1, 2011, pp. 105-114, XP011342204, ISSN: 0093-9994, DOI: 10.1109/TIA.2010.2090842 abstract V.Drive Control Scheme With MTPA Automatic Tracking figure 4.

(Continued)

*Primary Examiner* — Thai T Dinh
(74) *Attorney, Agent, or Firm* — Ralph E. Smith

(57) ABSTRACT

A sensorless position estimation and control system and method for a permanent magnet electric motor of a powertrain system of a vehicle involve determining a reference torque to be achieved by the electric motor based on a set of vehicle operating parameters, determining a reference current magnitude to achieve the determined reference torque using a lookup table, determining current commands for the electric motor based on the determined reference current magnitude and a fixed reference current angle, injecting a high frequency voltage into a voltage control loop for the electric motor and estimating, by the controller, a position of a rotor of the electric motor thereafter, and controlling a current provided to the electric motor based on the determined current commands and the estimated rotor position.

10 Claims, 4 Drawing Sheets

(51) Int. Cl.
*H02P 21/18* (2016.01)
*H02P 6/18* (2016.01)

(56) References Cited

U.S. PATENT DOCUMENTS

| | | | | |
|---|---|---|---|---|
| 6,894,454 | B2* | 5/2005 | Patel | H02P 21/00 |
| | | | | 318/700 |
| 6,924,617 | B2* | 8/2005 | Schulz | H02P 6/18 |
| | | | | 318/610 |
| 8,330,402 | B2 | 12/2012 | Ide et al. | |
| 8,963,459 | B2* | 2/2015 | Kim | H02P 21/18 |
| | | | | 318/400.02 |
| 9,948,224 | B1* | 4/2018 | Huh | H02P 21/26 |
| 2004/0113582 | A1 | 6/2004 | Ide | |
| 2004/0232862 | A1 | 11/2004 | Wogari et al. | |
| 2004/0257028 | A1 | 12/2004 | Schulz et al. | |
| 2010/0090632 | A1 | 4/2010 | Maekawa | |
| 2010/0156334 | A1 | 6/2010 | Nishimura et al. | |
| 2011/0062909 | A1 | 3/2011 | Patel et al. | |

OTHER PUBLICATIONS

International Search Report and Written Opinion dated Jan. 7, 2020, International Application No. PCT/US2019/051619, filed Sep. 18, 2019.

Kim, Hyunbae, et al., "A Novel Method for Initial Rotor Position Estimation for IPM Synchronous Machine Drives", IEEE Transactions on Industry Applications, vol. 40, No. 5 (2004).

Lee, Kahyun, et al., "Model-based MTPA control of permanent magnet synchronous machine drives under one-phase open-circuit fault", IEEE 8th International Power Electronics and Motion Control Conference (IPEMC-ECCE Asia) (2016).

Lee, Younggi, et al., "Fixed Current Apple Operation Strategy in Low-Speed Sensorless Drive for Improved Torque Capability over Critical Point", Conference, 2018 IEEE Energy Conversion Congress and Exposition (ECCE) 2018.

Petrovic, Vladan, et al., "Position Estimation in Salient PM Synchronous Motors Based on PWM Excitation Transients", IEEE Transactions on Industry Applications, vol. 39, No. 3 (2003).

\* cited by examiner

SENSORLESS POSITION ESTIMATION FOR INTERIOR PERMANENT MAGNET SYNCHRONOUS MOTOR

CROSS-REFERENCE TO RELATED APPLICATION

The present application claims the benefit of U.S. Provisional Application No. 62/733,955, filed on Sep. 20, 2018. The disclosure of this application is incorporated herein by reference in its entirety.

FIELD

The present application generally relates to electric motors and, more particularly, to techniques for sensorless position estimation for an interior permanent magnet synchronous motor (IPMSM).

BACKGROUND

A permanent magnet electric motor is a type of electric motor that uses permanent magnets rather than electromagnetic coils (also known as "field windings") that are commonly found in an induction motor. Permanent magnet electric motors are desirable for as traction motors for electrified vehicles due to their high power density and efficiency. One specific type of permanent magnet electric motor is an interior permanent magnet synchronous motor (IPMSM). This type of motor has permanent magnets embedded in the rotor laminations to create a magnetic field. It is necessary to track the position of the magnetic field and precisely control current provided to the stator coils for maximized performance and efficiency. Position sensors, such as resolvers, encoders, Hall effect sensors, eddy current sensors, and the like, are typically implemented to monitor rotor position. These devices, however, are costly and are sometimes potentially inaccurate. Accordingly, while such motor control systems do work well for their intended purpose, there remains a need for improvement in the relevant art.

SUMMARY

According to one example aspect of the invention, a powertrain system for a vehicle is presented. In one exemplary implementation, the system comprises: a permanent magnet electric motor configured to generate drive torque for propulsion of the vehicle and a controller configured to: perform sensorless position estimation on the permanent magnet electric motor by: (i) determining a reference torque to be achieved by the electric motor based on a set of vehicle operating parameters, (ii) determining a reference current magnitude to achieve the determined reference torque using a lookup table, (iii) determining current commands for the electric motor based on the determined reference current magnitude and a fixed reference current angle, and (iv) injecting a high frequency voltage into a voltage control loop for the electric motor and estimating a position of a rotor of the electric motor thereafter, and control a current provided to the electric motor based on the determined current commands and the estimated rotor position.

In some implementations, the controller determines the current commands for the electric motor to achieve the determined reference torque without utilizing a complex maximum torque per amp (MTPA) table. In some implementations, the controller obtains a compensation value that is applied to an estimated rotor position error without utilizing multiple complex look-up tables (LUTs). In some implementations, the controller does not utilize a position sensor to measure an actual position of the rotor.

In some implementations, the determining of the reference current magnitude and the current commands based on the determined reference current magnitude and a fixed reference current angle are performed across all possible values of the determined reference torque so as to not require an estimation/control strategy transition. In some implementations, the determining of the reference current magnitude and the current commands based on the determined reference current magnitude and a fixed reference current angle are performed only when the determined reference torque exceeds a threshold. In some implementations, when the determined reference torque is less than the threshold, the controller is further configured to determine the current commands for the electric motor using a complex MTPA table.

According to another example aspect of the invention, a sensorless position estimation and control method for a permanent magnet electric motor of a powertrain system of a vehicle is presented. In one exemplary implementation, the method comprises: determining, by a controller of the powertrain system, a reference torque to be achieved by the electric motor based on a set of vehicle operating parameters, determining, by the controller, a reference current magnitude to achieve the determined reference torque using a lookup table, determining, by the controller, current commands for the electric motor based on the determined reference current magnitude and a fixed reference current angle, injecting, by the controller, a high frequency voltage into a voltage control loop for the electric motor and estimating, by the controller, a position of a rotor of the electric motor thereafter, and controlling, by the controller, a current provided to the electric motor based on the determined current commands and the estimated rotor position.

In some implementations, determining the current commands for the electric motor to achieve the determined reference torque is performed without utilizing a complex MTPA table. In some implementations, obtaining a compensation value that is applied to an estimated rotor position error is performed without utilizing multiple complex LUTs. In some implementations, the controller does not utilize a position sensor to measure an actual position of the rotor.

In some implementations, the determining of the reference current magnitude and the current commands based on the determined reference current magnitude and a fixed reference current angle are performed across all possible values of the determined reference torque so as to not require an estimation/control strategy transition. In some implementations, the determining of the reference current magnitude and the current commands based on the determined reference current magnitude and a fixed reference current angle are performed only when the determined reference torque exceeds a threshold. In some implementations, when the determined reference torque is less than the threshold, the method further comprises determining, by the controller, the current commands for the electric motor using a complex maximum torque per amp MTPA table.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
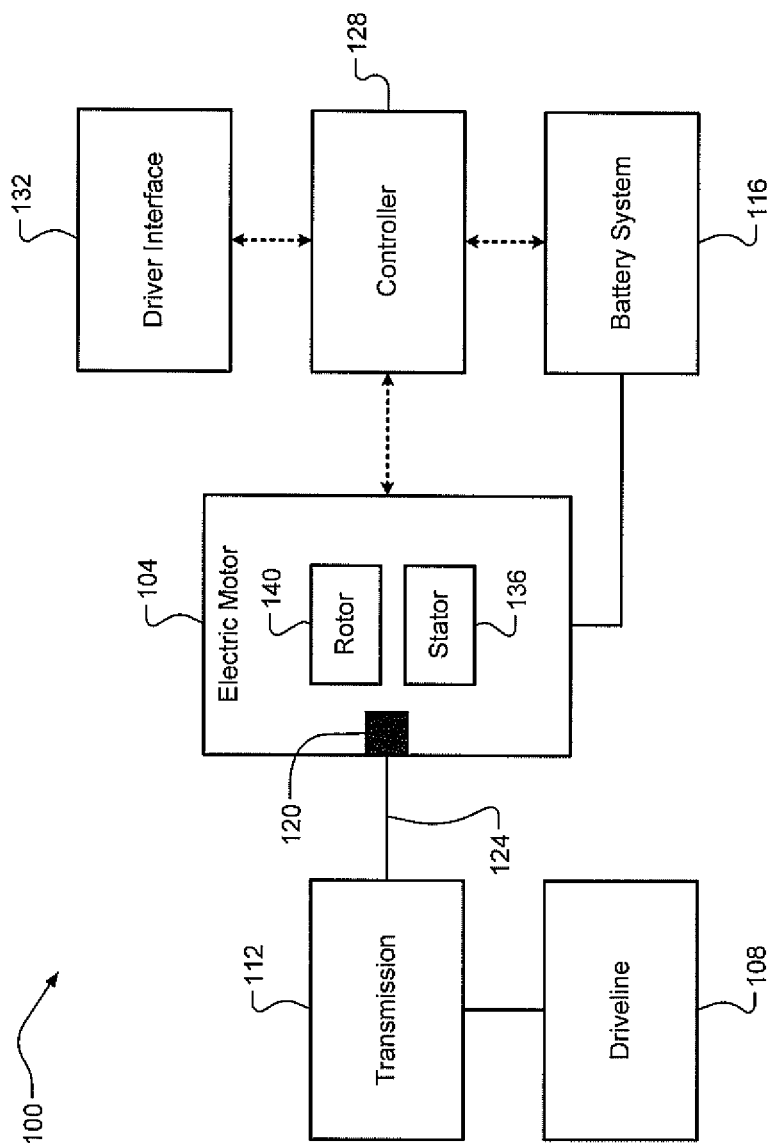
FIG. 1 is a functional block diagram of an example electrified vehicle having a permanent magnet electric motor according to the principles of the present disclosure.

Referring now to FIG. 1, a functional block diagram of an example electrified vehicle 100 (hereinafter, "vehicle 100") is presented. It will be appreciated that the illustrated vehicle 100 is merely one configuration of an interior permanent magnet (IPM) motor in an electrified or hybrid vehicle and that the systems/methods of the present disclosure are applicable to any suitable IPM vehicle application. The vehicle 100 comprises a permanent magnet electric motor 104 (hereinafter, "motor 100") that generates drive torque, which is transferred to a driveline 108 via a transmission 112 to propel the vehicle 100. In one exemplary implementation, the motor 104 is an interior permanent magnet synchronous motor (IPMSM). While an IPMSM for vehicle applications is specifically discussed herein, it will be appreciated that the sensorless position estimation techniques of the present disclosure could be applicable to non-vehicle applications as well as other suitable permanent magnet electric motors, such as a surface permanent magnet synchronous motors (SPMSM) where the permanent magnets are attached to the rotor lamination surface as opposed to be embedded therein like an IPMSM.

While a single motor 104 is illustrated and discussed herein, it will also be appreciated that the vehicle 100 could include multiple motors and/or an engine (not shown) for generating propulsive drive torque. For example only, the vehicle 100 could be an electrically all-wheel drive (eAWD) having the motor 104 coupled to one axle of the driveline 108 and an engine/transmission (an optionally, another electric motor, such as a belt-driven starter generator, or BSG unit) coupled to another axle of the driveline 108. A battery system 116 provides a current for powering the motor 104. A motor speed sensor 120 measures a rotational speed of an output shaft 124 of the motor 104. A controller 128 controls operation of the vehicle 100, including controlling the current supplied to the motor 104 to achieve a desired propulsive torque to meet a driver torque demand (e.g., based on input via driver interface 132). More specifically, the controller 128 controls the current supplied to a stator 136 (e.g., stator windings) of the motor 104, which varies a magnetic field that displaces a rotor 140 of the motor 104, which has permanent magnets embedded in its laminations. The motor 104 and the controller 128 are also referred to collectively herein as "a powertrain system" of the vehicle 100.

The position of the rotor 140 is one factor in precisely controlling the stator current supply to achieve optimal motor performance and efficiency. As previously discussed, however, position sensors for permanent magnet electric motors are expensive and sometimes are inaccurate. As a result, sensorless position estimation techniques for permanent magnet electric motors are preferred. The benefits of sensorless position estimation techniques include, but are not limited to, decreased costs, decreased space/packaging (the sensor, its associated wiring, etc.), decreased weight, and increased reliability. Conventional sensoriess control techniques are generally divided into two categories depending upon the motor speed: (1) high frequency (HF) signal injection sensoriess control (SISC), preferred for low-speed operation, and (2) model-based sensoriess control, which is more suitable for high-speed operation.

In conventional HF SISC, however, a sufficient saliency ratio between the d- and q-axes (e.g., inductance variation at the axes, or $L_d/L_q$, where $L_d$ is the inductance in the d-axis where the rotor is aligned with the magnetic poles and $L_q$ is the inductance in the q-axis where the rotor is aligned with the gaps) should be guaranteed for stable position estimation because position error information in the current response weakens as the saliency ratio decreases and disappears at a critical point (where $L_d=L_q$). Thus, conventional HF SISC limits the operating region and the motor torque capability based on the saliency ratio, which has an inverse relationship with the load condition under a base speed. This limitation could be problematic, however, for certain applications, such as an engine starting/cranking motor and a low-temperature oil pump, where a peak torque of the motor is required for a short time at the starting and initial motor operation. One conventional approach to overcome this limitation is modifying the motor design, which is costly and complex.

Another conventional approach to overcome this limitation is modification of the HF SISC control strategy. The latter, for example, utilizes multiple complex look-up tables (LUTs) to modify a convergence point of a position error signal and an injection angle based on the motor operating point. Accordingly, improved sensorless position estimation and control techniques for permanent magnet electric motors are presented herein. These techniques focus on improved low-speed HF SISC sensorless drive. While these techniques may be particularly beneficial during low speed, high torque operation, these techniques could also be applied in all situations (e.g., low speed, low torque). This could avoid, for example having to make an estimation/control strategy transition as the torque increases past a torque threshold. The techniques of the present disclosure are simpler than the conventional techniques described above due to the ability to determine the d-q current references from a one-dimensional table without any additional LUTs for compensation. This simplicity allows for decreased processor/memory requirements, thereby saving costs and potentially increasing estimation speed.

Figure 2:
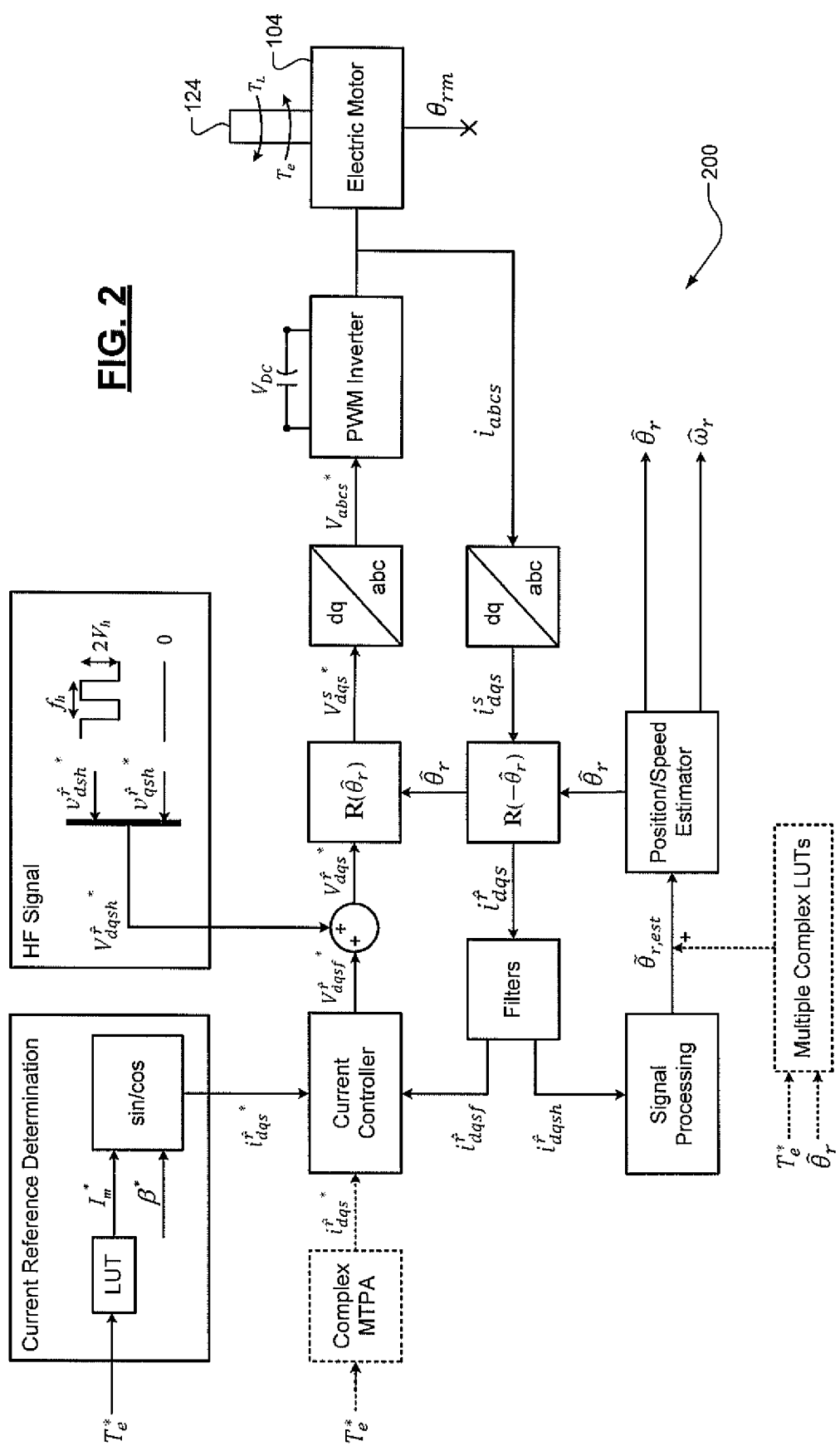
FIG. 2 is a functional block diagram of an example sensorless position estimation and control architecture for a permanent magnet electric motor of an electrified vehicle according to the principles of the present disclosure.

Referring generally now to FIG. 2, an example control architecture 200 for the sensorless position estimation and control techniques of the present disclosure is illustrated. This control architecture, for example, could be implemented at controller 128. As shown, a pulsating square-wave voltage is injected for SISC having a magnitude and frequency of $V_h$ and $f_h$, respectively. When the HF reference voltages are defined by Equation (1) below, the current variation can be derived by Equation (2) below in the estimated rotor reference frame where two sample delay by digital control has been considered:

$$\begin{bmatrix} v_{dsh}^{\hat{r}*}[n] \\ v_{qsh}^{\hat{r}*}[n] \end{bmatrix} = \begin{bmatrix} V_h \cdot clk[n] \\ 0 \end{bmatrix}, \text{ and} \quad (1)$$

$$\begin{bmatrix} \Delta i_{ds}^{\hat{r}}[n] \\ \Delta i_{qs}^{\hat{r}}[n] \end{bmatrix} = \frac{V_h T_s clk[n-2]}{L_{dsh} L_{qsh} - L_{dqsh}^2} \begin{bmatrix} \Sigma L_{sh} - \Delta L_{sh} \cos 2\tilde{\theta}_r + L_{dqsh} \sin 2\tilde{\theta}_r \\ -\Delta L_{sh} \sin 2\tilde{\theta}_r - L_{dqsh} \cos 2\tilde{\theta}_r \end{bmatrix}. \quad (2)$$

where clk[n] refers to an alternating clock signal between −1 and 1 with the frequency of $f_h$ and $\tilde{\theta}_r$ represents a position estimation error defined as the difference between the real rotor position, $\theta_r$, and the estimated position, $\hat{\theta}_r$. Also, $T_s$ represents a sampling period and $\Sigma L_{sh} \equiv (L_{dsh} + L_{qsh})/2$, $\Delta L_{sh} \equiv (L_{dsh} - L_{qsh})/2$. In Equation (2), it should be noted that $L_{qdsh}$ is replaced by Ldqsh because they are mathematically the same.

After the HF signal, $V_{dqsh}^{\hat{r}*}$, is injected onto a fundamental component, $V_{dqsf}^{\hat{r}*}$, an estimated position error, $\tilde{\theta}_{rest}$, is fed into a position and speed estimator. Here, the estimated position error can be obtained by dividing $\Delta i_{qs}^{\hat{r}}$ by the estimated $I_\Delta \cdot clk[n]$ in Equation (3) below:

$$\Delta i_{qs}^{\hat{r}}[n] = i_{sig} \cdot clk[n-2] = I_\Delta \sin(2\tilde{\theta}_r - 2\phi_\Delta) \cdot clk[n-2] \quad (3),$$

where $i_{sig}$ corresponds to $I_\Delta \sin(2\tilde{\theta}_r - 2\emptyset_\Delta)$ and $I_\Delta$ and $\blacklozenge_\Delta$ are defined by Equations (4) and (5) below:

$$I_\Delta = \frac{V_h T_s \sqrt{\Delta L_{sh}^2 + L_{dqsh}^2}}{L_{dsh} L_{qsh} - L_{dqsh}^2}, \text{ and} \quad (4)$$

$$\phi_\Delta = \frac{1}{2} \operatorname{atan2}(L_{dqsh}, -\Delta L_{sh}), \quad (5)$$

where the various L-terms represent are from a Jacobian matrix of d- and q-axes flux to d- and q-axes current.

By the estimation principle of the estimator, resulting position estimation error in steady state can be calculated by Equation (6) below:

$$\tilde{\theta}_r = \begin{cases} \phi_\Delta & (I_m < I_c) \\ \frac{1}{2}[180° + 2\phi_\Delta]_{-\pi}^{\pi} & (I_m > I_c) \end{cases}, \quad (6)$$

where $I_m$ and $I_c$ represent the magnitude of the current at the operating point and that of the current at the critical point, respectively. Also, $[x]_m^n$ means that the variable x is bounded from m to n. The relationship in Equation (6) can be derived by replacing the $\sin(2\tilde{\theta}_r - 2\phi_\Delta)$ term in Equation (3) with zero.

Using Equations (5) and (6), the effect of cross-coupling inductance, $L_{dqsh}$, can be discussed. That is, smaller $L_{dqsh}$ at the operating point would result in smaller $\tilde{\theta}_r$. For example, $\tilde{\theta}_r$ would be zero is there were no $L_{dqsh}$. Also, it can be noted that $2\phi_\Delta$ in the region over the critical point has a magnitude close to 180 degrees. Therefore, in this case, $\tilde{\theta}_r$ can be kept small if it is determined for $2\tilde{\theta}_r - 2\phi_\Delta$ to be +/−180 degrees. Even if it seems that this operating point is unstable because directions of $\tilde{\theta}_r$ and $i_{sig}$ are reversed, it will be disclosed that it can be a stable point if a condition that depends on the design characteristics is satisfied.

Estimation of the expected position error using Equation (6), however, is different with the actual position error. This is because the simple calculation of Equation (6) using dynamic inductances cannot consider closed-loop sensorless operation. Since $L_{dqsh}$ and $\Delta L_{sh}$ are the function of d- and q-axes current and $\theta_r$, $\hat{\theta}_r$ in the steady state continuously varies while the operating point moves to a stable convergence point. As previously mentioned herein, previous techniques aim to compensate for this by adding the calculated or measured position error to the input to cancel out the error resulted from cross-coupling and harmonic inductances. These techniques, however, achieve this by using multiple complex LUTs (see dashed box/lines) for compensation at the input to the position and speed estimator in addition to a complex maximum torque per amp (MTPA) table (see dashed box/lines).

Figures 3A, 3B:
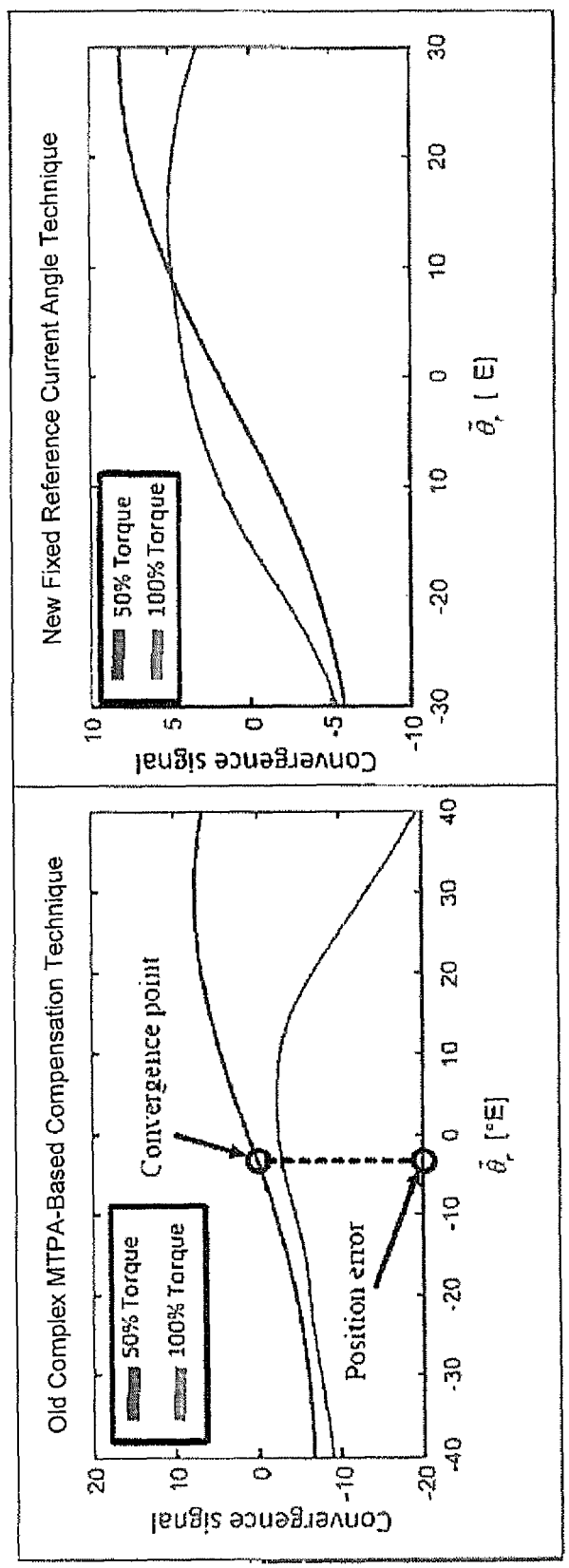
FIGS. 3A-3B are plots of performance of compensation-based motor position estimation and control technique and a fixed reference current angle motor position estimation and control technique according to the principles of the present disclosure.

Referring now to FIGS. 3A-3B and with continued reference to FIG. 2, plots of the performance of the compensation-based techniques described above (left) and fixed reference current angle technique techniques of the present disclosure (right) are illustrated. These plots illustrate the position estimation stability of the estimation techniques of the present disclosure compared to those of the conventional estimation techniques. As shown in the left plot, at 100% torque, the convergence signal (the lower of the two lines) never crosses zero. In contrast, as shown in the right plot, at 100% torque, the convergence signal (initially the upper line, then the lower line) crosses zero thereby giving robust convergence. In other words, the MTPA torque commands provide the most efficient operation but are unstable and thus not a solution at high torque levels, even with the compensation performed by conventional techniques. The techniques of the present disclosure achieve the peak torque requirements by shifting the commanded current to provide stable operation with minimal efficiency sacrifice.

Referring again to FIG. 2, a simple LUT replaces the complex MTPA table to determine a current magnitude reference $I_m^*$; based on the torque reference $T_e^*$. Further, if the system does not require accurate torque control, the LUT can be, eliminated altogether and the reference can be generated sir ply regulating $I_m^*$. A reference current angle $\beta^*$ represents the difference between the angle of current vector and the estimate q-axis. In the techniques of the present disclosure, the reference current angle $\beta^*$ is fixed as a constant. Thus enables the LUT in FIG. 2 to be half of the size of the conventional MTPA table. The criticality in the techniques of the present disclosure is selecting the appropriate value for the reference current angle $\beta^*$.

In determining the value for $\beta^*$, stability and MTPA tracking should be simultaneously considered. For stable operation, $i_{sig}$ by $\tilde{\theta}_r$ should have positive slope at the point of $i_{sig} = 0$. Also $\beta^*$ should satisfy Equation (7) below for the actual current in the rotor reference frame to operate on the MTPA trajectory:

$$2\tilde{\theta}_r - 2\phi_\Delta = 2(\beta^* - \beta_{MTPA}) - 2\phi_{\Delta,MTPA} = 0° \text{ or } \pm 180° \quad (7)$$

In the above, 0 degrees or 180 degrees is determined by $I_m$. Therefore, proper $\beta^*$ to operate on the MPTA trajectory can be obtained from Equation (7) using the data on the operating point. Unstable points with a negative slope at $i_{sig} = 0$ can be removed. It could be implied that $\beta^*$ should have a different value according to $\tilde{\theta}_r$ for MTPA tracking. However, this is impractical because the discontinuity differs in every $\tilde{\theta}_r$. Moreover, an improper $\beta^*$ in the region over the discontinuity may lead to instability. Thus, when this fixed $\beta^*$ control scheme is used, only $I_m^*$ is determined from the LUT to generate the desired $T_e^*$. This relationship between $T_e^*$ and $I_m^*$ could be extracted, for example, by actual experiment using a torque sensor or finite element analysis (FEA).

Figure 4:
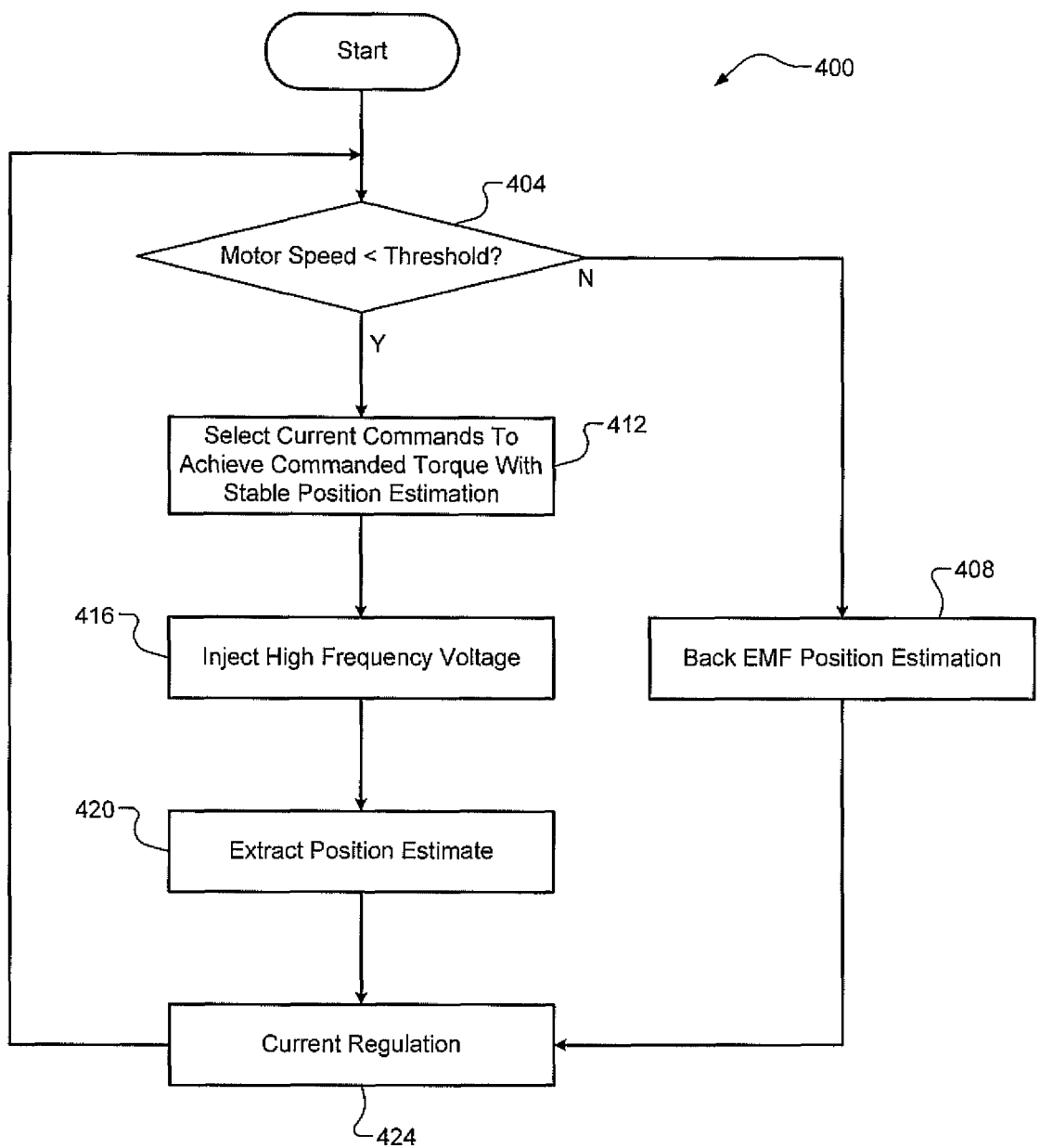
FIG. 4 is a flow diagram of an example sensorless position estimation and control method for a permanent magnet electric motor of an electrified vehicle according to the principles of the present disclosure.

Referring now to FIG. 4, a flow diagram of an example method 400 of sensorless position estimation and control of a permanent magnet electric motor (e.g., motor 104) is illustrated. It will be appreciated that the various steps described below could be performed by controller 128, by another controller, or some combination thereof. At 404, the method 400 determines whether the motor speed (e.g., measured by sensor 120) is less than a threshold. This threshold could be indicative of low-speed operation such that the control techniques of the present disclosure are necessary in order to achieve full torque demand.

As previously mentioned, however, this method 400 may not be limited to only certain operation regions, such as low speed, high torque. Instead, the method 400 could be applicable to all operating regions (e.g., low speed, low torque). This could avoid, for example having to make an estimation/control strategy transition (from conventional techniques to the disclosed techniques) as the torque increases past a torque threshold, which could cause a delay or otherwise increase complexity. Thus, step 404 can be considered optional or specific to only applying the method 400 during low speed, high torque operation.

When 404 is false, the method 400 proceeds to 408 where back electro-motive force (EMF) estimation is performed and the method 400 proceeds to 424. When 404 is true, the method 400 proceeds to 412 where the current commands $i_{dqs}^{\hat{r}*}$ are selected to achieve the commanded torque $T_e^*$ with stable position estimation as described above (i.e., fixed $\beta^*$, $I_M$ determined to achieve $T_e^*$ using LUT). It will be appreciated that step 412 could also involve a condition check for stable operation as previously described herein. At 416, the method 400 injects the high frequency voltage ($V_{dqsh}^{\hat{r}*}$; see FIG. 2). At 420, the method 400 extracts the position estimate ($\hat{\theta}_r$; see FIG. 2). At 424, the method 400 regulates the motor current based on the estimated position and the estimated back-EMF, if applicable. The method 400 then returns to 404 and repeats.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A powertrain system for a vehicle, the powertrain system comprising:
   a permanent magnet electric motor configured to generate drive torque for propulsion of the vehicle; and
   a controller configured to:
      perform sensorless position estimation on the permanent magnet electric motor across all load/torque operating regions by:
         (i) determining a reference torque to be achieved by the electric motor based on a set of vehicle operating parameters,
         (ii) determining a reference current magnitude to achieve the determined reference torque using a first maximum torque per amperage (MTPA) table,
         (iii) selecting a fixed reference current angle that simultaneously satisfies stability and MTPA tracking constraints, wherein the fixed reference current angle provides for a smaller sized first MTPA table and eliminates estimation/control strategy transitions across different load/torque operating regions,
         (iv) determining current commands for the electric motor based on the determined reference current magnitude and the fixed reference current angle, and
         (v) injecting a high frequency voltage into a voltage control loop for the electric motor and estimating a position of a rotor of the electric motor thereafter; and
      control a current provided to the electric motor based on the determined current commands and the estimated rotor position.

2. The system of claim 1, wherein the controller determines the current commands for the electric motor to achieve the determined reference torque without utilizing a larger and more complex second MTPA table.

3. The system of claim 1, wherein the controller obtains a compensation value that is applied to an estimated rotor position error without utilizing multiple complex look-up tables (LUTs).

4. The system of claim 1, wherein the determining of the reference current magnitude and the current commands based on the determined reference current magnitude and the fixed reference current angle are performed across all possible values of the determined reference torque so as to not require an estimation/control strategy transition.

5. The system of claim 1, wherein the controller does not utilize a position sensor to measure an actual position of the rotor.

6. A sensorless position estimation and control method for a permanent magnet electric motor of a powertrain system of a vehicle, the method comprising:
   performing, by a controller of the powertrain system, sensorless position estimation on the permanent magnet electric motor across all load/torque operating regions by:
      determining, by the controller, a reference torque to be achieved by the electric motor based on a set of vehicle operating parameters;
      determining, by the controller, a reference current magnitude to achieve the determined reference torque using a first maximum torque per amperage (MTPA) table;
      selecting, by the controller, a fixed reference current angle that simultaneously satisfies stability and MTPA tracking constraints, wherein the fixed reference current angle provides for a smaller sized first MTPA table and eliminates estimation/control strategy transitions across different load/torque operating regions;

determining, by the controller, current commands for the electric motor based on the determined reference current magnitude and the fixed reference current angle; and injecting, by the controller, a high frequency voltage into a voltage control loop for the electric motor and estimating, by the controller, a position of a rotor of the electric motor thereafter; and controlling, by the controller, a current provided to the electric motor based on the determined current commands and the estimated rotor position.

7. The method of claim 6 wherein determining the current commands for the electric motor to achieve the determined reference torque is performed without utilizing a larger and more complex second MTPA table.

8. The method of claim 6, wherein obtaining a compensation value that is applied to an estimated rotor position error is performed without utilizing multiple complex look-up tables (LUTs).

9. The method of claim 6, wherein the determining of the reference current magnitude and the current commands based on the determined reference current magnitude and the fixed reference current angle are performed across all possible values of the determined reference torque so as to not require an estimation/control strategy transition.

10. The method of claim 6, wherein the controller does not utilize a position sensor to measure an actual position of the rotor.

* * * * *